(No Model.)

J. A. LANGDON.
FURNACE.

No. 341,253. Patented May 4, 1886.

Witnesses:
Jno Oakes
J. E. Barnes.

Inventor.
Joseph A. Langdon
By James D. Hay
Attorney

UNITED STATES PATENT OFFICE.

JOSEPH A. LANGDON, OF PITTSBURG, PENNSYLVANIA.

FURNACE.

SPECIFICATION forming part of Letters Patent No. 341,253, dated May 4, 1886.

Application filed December 22, 1885. Serial No. 186,420. (No model.)

*To all whom it may concern:*

Be it known that I, JOSEPH A. LANGDON, of Pittsburg, in the county of Allegheny and State of Pennsylvania, have invented a new and useful Improvement in Furnaces; and I do hereby declare the following to be a full, clear, and exact description thereof.

My invention relates to boilers and similar furnaces, its object being to provide a simple and efficient means within the ordinary fire-chamber of the boiler for burning natural and similar gas and heating the air before it comes in contact with the gas.

It consists, essentially, in combining with the fire-chamber a hot-air chamber formed therein, a cold-air chamber within the hot-air chamber, and a gas-burner surrounding the hot-air chamber, the hot-air chamber communicating at its upper end with the cold-air chamber, and being provided with suitable ports at or near its base for the entrance of air into the fire-chamber, so that as the air passes upwardly through the cold-air chamber it strikes the top or cover thereof and becomes heated by the heat radiated through the walls of the hot-air chamber as it descends through the hot-air chamber to the ports at the base thereof, the air in this manner being brought to a high heat, so that when fed into the fire-chamber, where it comes in contact with and intermingles with the gas, a substantially perfect combustion of the gases is obtained and a high and even heat generated, the products of combustion passing upwardly through the fire-chamber, and thence through the tubes or flues of the boiler, or, if employed with the metallurgical furnaces, passing from the fire-chamber entering the furnace.

It also consists in certain details of construction, as hereinafter set forth.

To enable others skilled in the art to make and use my invention, I will describe the same more fully, referring to the accompanying drawings, in which—

Figure 1:
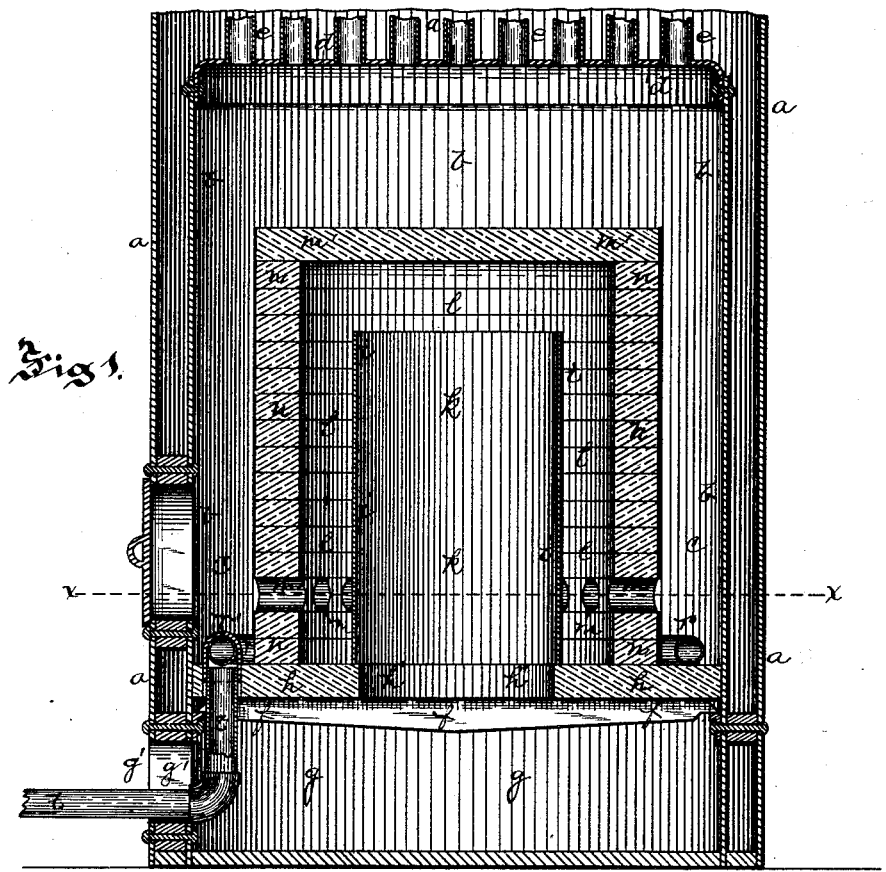
Figure 2:
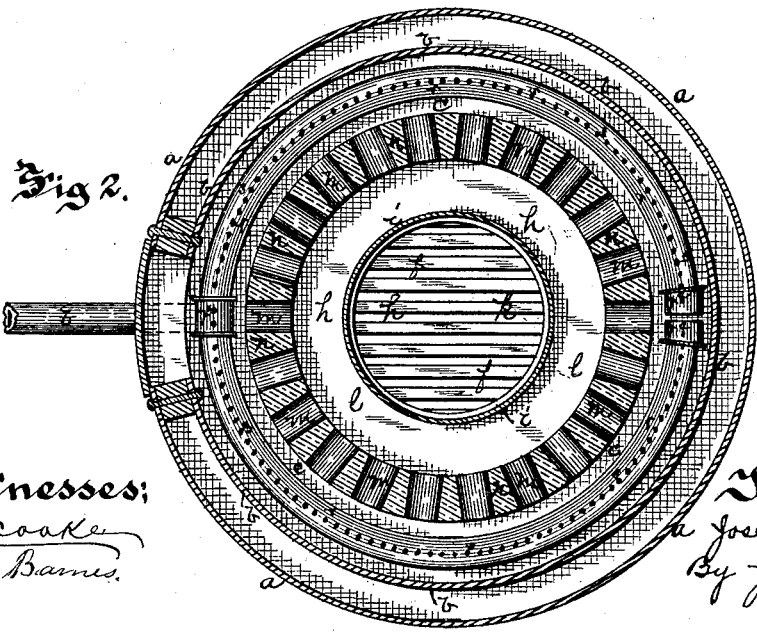

Figure 1 is a vertical central section of my improved furnace as applied to the ordinary vertical boiler; and Fig. 2 is a cross-section of the same through the line *x x*, Fig. 1.

Like letters of reference indicate like parts in each.

In the boiler-furnace shown the fire-chamber is supported on a brick foundation or base having the outer shell, *a*, and the inner shell, *b*, which forms the wall of the fire-chamber *c*, the tube-sheet *d* forming the top of the fire-chamber, and from this tube-sheet the tubes *e* extending vertically for the desired distance, the products of combustion passing upwardly through the fire-chamber, and thence through the tubes, which are surrounded with water, the steam being generated by the heat radiated through the end of the shell *b* and through the tubes *e*.

Extending across the base of the fire-chamber are the ordinary grate-bars, *f*, my improved furnace being illustrated as applied to the ordinary boiler in which solid fuel has been employed; and below the grate-bars is the ash-pit or space *g*, the space having the entrance *g'*.

On the grate-bars *f* is formed the bed *h*, this bed being built of brick-work, and having in the center thereof the opening *h'*, through which the air enters through the ash-pit *g*.

Supported on the bed *h*, in the center thereof, is a tube or shell, *i*, which extends up a little over one-half the height of the fire-chamber, and forms the cold-air chamber *k* within the furnace, this tube or shell being generally formed of wrought metal, and in the ordinary furnace being formed of sections of pipe.

Surrounding this cold-air chamber *k* is the hot-air chamber *l*, which is formed by means of a suitable brick-work wall, *n*, built upon the bed *h*, and having the top or cover *m'*, formed of a slab or tile, which extends across a short distance above the top of the shell *i*.

At or near the base of the wall *n* are formed the ports *m*, through which the air enters the fire-chamber, the air passing upwardly from the space *g* through the cold-air chamber *k*, and striking the cover *m'* of the hot-air chamber, and thence downwardly through the hot-air chamber to the ports, where it passes out into the fire-chamber *c*, this fire-chamber surrounding the hot-air chamber and extending above the same, as shown.

Resting on the bed *h* is the burner *r*, which is formed of a curved pipe extending around the base-wall *n* of the hot-air chamber; and forming a circular burner, the burner being generally formed of two pipes bent into a semicircle, which pipes are connected by means of a T-socket, r', and have their opposite ends closed by plugs r''.

Through the top of the burner r are formed perforations, as at s, through which the gas enters the fire-chamber, it being preferred that the ports m enter the fire-chamber a short distance above the burner, so that as the gas enters the fire-chamber from the burner the heated air will pass across the course of the gas and become thoroughly intermingled therewith. The gas is conducted to the burner r through a suitable pipe, t, which passes through the door or opening g', and thence upwardly through the bed h, communicating with the T-socket r, this gas-pipe t being controlled by a suitable valve.

When my improved furnace is in use, the gas enters through the pipe t and the burner r, as above described, rising into the fire-chamber from the burner, and the cold air enters at the door or opening g' in the ash pit or space g, and, thence passing up through the opening in the bed h, rises into the cold-air chamber k and strikes against the slab or cover m' of the hot-air chamber, and thence passes downwardly through said chamber and through the ports or openings m into the fire-chamber, where it forms combustion with the gas and rises upwardly through the fire-chamber, the heat and products of combustion passing thence through the boiler flues or tubes, or, where employed with a heating-furnace, over the bridge-wall. The heat generated in the fire-chamber is radiated through the walls m of the hot-air chamber and through the slab or cover m', so that as the cold air enters it is gradually heated by the heat radiated through the shell i from the hot-air chamber, and is brought to a much higher heat as it strikes the slab or cover m', and passes downwardly through the hot-air chamber in contact with the walls m, the air being brought to a very high heat by these means before it enters the fire-chamber, and a much more perfect combustion of the gas and air being obtained. A much higher heat is therefore generated than where the cold air comes in contact with the gas and is heated by the partial combustion of the gas and air and the air as it rises upwardly through the air-chamber, practical experience showing that for boiler purposes by my improved furnace I am enabled to obtain a much higher heat and a more perfect combustion of the gas than can be obtained in any furnace heretofore known to me, and also effect a large saving in the proportion of fuel employed. I thus do away with the necessity of the employment of broken firebrick or like refractory material, filling the fire-chamber of the boiler, and therefore prevent the clogging of the holes in the gas-burner, so overcoming one of the greatest difficulties in operating these furnaces by the employment of this gaseous fuel.

My improved burner is simple in construction, and can be applied to any boiler or like furnace heretofore in use at a small cost, neither the burner nor the material necessary to form the chambers within the fire-chamber requiring any special construction of apparatus or skilled labor in applying the same. It is applicable to both vertical and horizontal boilers.

What I claim as my invention, and desire to secure by Letters Patent, is—

1. In boiler and like furnaces, the combination, with the fire-chamber, of the hot-air chamber formed within the same and communicating therewith at or near the base thereof, the cold-air chamber within the hot-air chamber and communicating therewith at the top thereof, and a burner within the fire-chamber surrounding the base of the hot-air chamber, substantially as and for the purposes set forth.

2. In boiler and like furnaces, the combination, with the fire-chamber, of the bed h, the walls n, and slab or cover m', forming the hot-air chamber l, and having the ports m at or near the base thereof, the shell i within the hot-air chamber, and communicating at the top with said chamber and at the base with the space g, the perforated burner r at the base of the fire-chamber, and the supply-pipe t.

In testimony whereof I, the said JOSEPH A. LANGDON, have hereunto set my hand.

JOSEPH A. LANGDON.

Witnesses:
C. C. LEE,
J. N. COOKE.